UNITED STATES PATENT OFFICE.

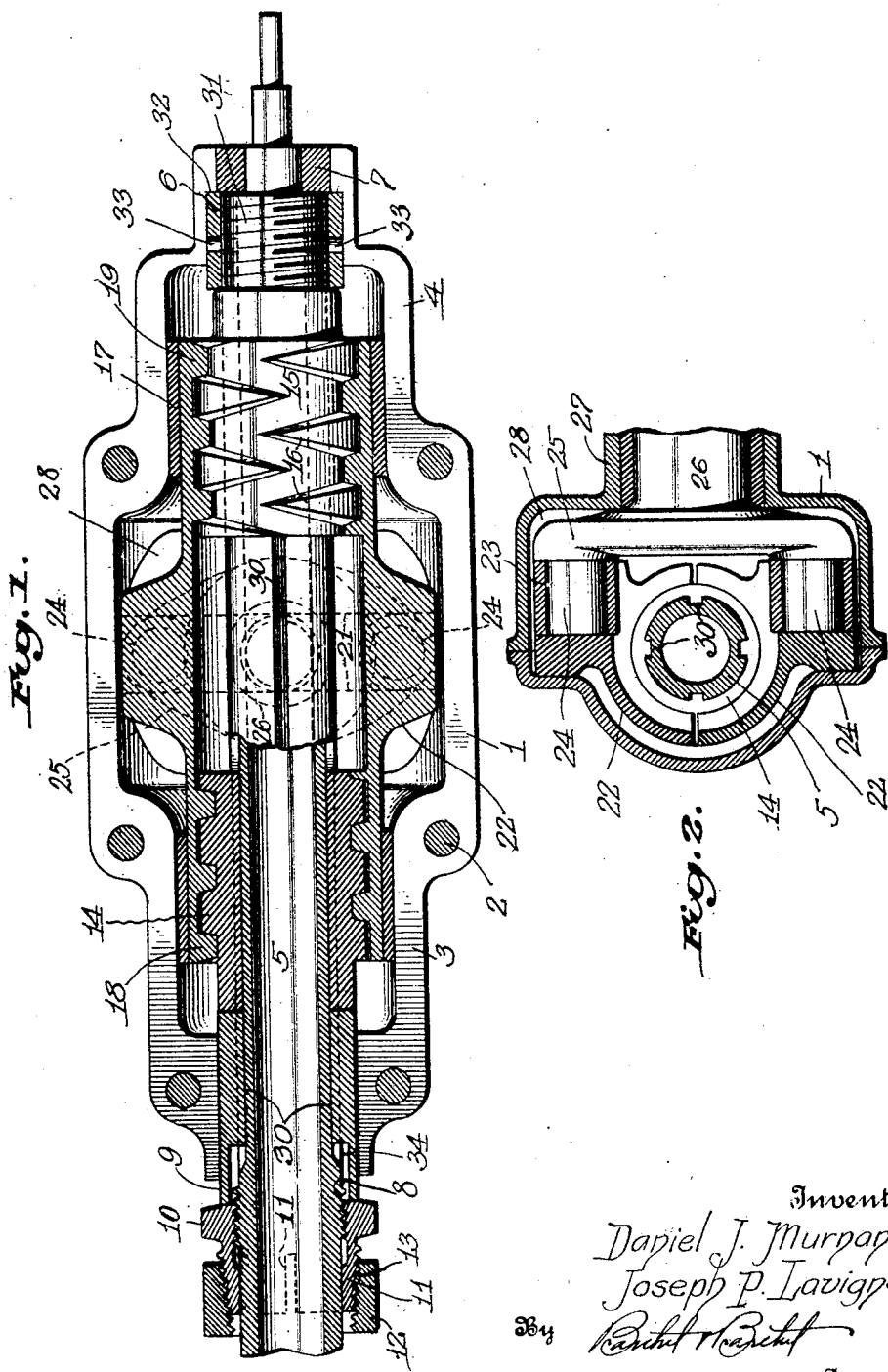

DANIEL J. MURNANE, OF CHICAGO HEIGHTS, ILLINOIS, AND JOSEPH P. LAVIGNE, OF DETROIT, MICHIGAN, ASSIGNORS TO DETROIT MECHANICAL ENGINEERING COMPANY, OF DETROIT, MICHIGAN, A CORPORATION OF MICHIGAN.

STEERING-GEAR ADJUSTMENT.

1,368,044.  Specification of Letters Patent.  Patented Feb. 8, 1921.

Application filed May 19, 1919. Serial No. 298,022.

*To all whom it may concern:*

Be it known that we, DANIEL J. MURNANE and JOSEPH P. LAVIGNE, citizens of the United States of America, residing at Chicago Heights, in the county of Cook and State of Illinois, and Detroit, in the county of Wayne and State of Michigan, respectively, have invented certain new and useful Improvements in Steering-Gear Adjustments, of which the following is a specification, reference being had therein to the accompanying drawings.

In Patent No. 993,326, granted May 23, 1911, there is disclosed a steering gear for motor vehicles, wherein a threaded shaft is employed for moving parts or sections of a nut in opposite directions for imparting movement to a rock shaft, which transmits motion to steering knuckles of a front axle assembly or parts to be actuated by the steering gear.

In another Patent No. 1,222,872, granted April 17, 1917, there is a novel steering shaft and two-part or sectional nut, that obviates the necessity of using a multiplicity of threads to transmit motion from the shaft to the parts of the nut.

The present invention aims to provide positive and reliable means, in a manner as hereinafter set forth, to compensate for wear between the threads of the shaft and the nut in engagement therewith, said means being adjustable so as to take up lost motion, prevent rattling or chattering, and insure a positive action between the shaft and its nut.

Our invention will be hereinafter specifically described and then claimed, and reference will now be had to the drawing, wherein—

Figure 1 is a longitudinal sectional view of the steering gear, partly in elevation; and Fig. 2 is a cross sectional view of the same.

In order that the present invention may be fully understood there is shown a two-part casing 1, having the parts thereof suitably connected together, as at 2, and said casing is provided with reduced ends 3 and 4.

Extending longitudinally of the casing 1 is a steering shaft 5 which has an end thereof provided with screwthreads 31 to receive an interiorly screwthreaded bushing 6. In addition to the screwthreads there may be a pin or pins 33 positively retaining the bushing on the threaded portion of the shaft.

The bushing 6 is journaled in the reduced end 4 of the casing and abuts an annular shoulder 32 of said casing and a bearing 7 mounted in said casing, said shoulder and bearing receiving any end thrust of the steering shaft. If necessary an anti-frictional ball or roller bearing may be interposed between the shoulder 32 and the bushing 6. The shaft 5 within the casing 1, is longitudinally grooved, as at 30, and exteriorly screwthreaded adjacent to the end of the casing, as at 8. Slidable on the grooved shaft 5 and extending into the grooves thereof is a sleeve 9 by which the steering shaft 5 is journaled in the reduced end 3 of the casing. The outer end of the sleeve 9 is recessed, as at 34, to provide clearance for a portion of the screw threads 8.

Screwed on the threaded portion 8 of the shaft 5 is a nut 10 having a slitted end 11 that is tapered and screwthreaded, as at 13, to receive a lock nut 12 by which the slitted end 11 of the nut 10 is contracted about the shaft 5 to hold the nut 10 in an adjusted position relative to said steering shaft. After loosening the lock nut 12, the nut 10 may be rotated and the sleeve 9 shifted longitudinally of the steering shaft 5 and when said adjustable sleeve is correctly positioned, the nut 10 may be tightened and then the lock nut 12 to positively clamp the adjustable nut 10 on the steering shaft 5 against accidental rotation relative thereto and yet not interfere with the rotation of said steering shaft relative to the casing 1.

Keyed or otherwise mounted on the grooved portion of the steering shaft 5, within the ends of the casing 1, are spaced apart sleeves 14 and 15 having the peripheries thereof provided with cross cut or diamond shaped threads 16 forming right hand screw threads for one sleeve and left hand screw threads for the other sleeve. One end of the sleeve 14 is engaged by the slidable sleeve 9 and may be shifted thereby, and one end of the sleeve 15 engages the bushing 6 and bears against said bushing during rotation of said sleeve.

In the reduced ends 3 and 4 of the casing are bushings or bearings 17 for the semi-cylindrical end portions of a two-part or sectional nut, the parts of said nut being designated 18 and 19. The nut parts are threaded for engagement with the sleeves 14 and 15, so that when the steering shaft 5 is rotated the two halves of the nut will be moved in opposite direction. Each half of the nut is formed with a transverse slot 21, said slots being formed in enlargements 22 intermediate the ends of the nut. The slots 21 receive blocks 23 which are free to slide therein and from the shaft 9, and these blocks form bearings for studs 24 on the ends of a cross head or plate 25 formed integral with a rock shaft 26 extending laterally through a bearing 27 at one side of the casing. The cross head or plate 25 lies close to the side of the nut within a recess or offset portion 28 in one part of the casing.

When the steering shaft 5 is rotated to move one-half of the nut in one direction and the other half in the opposite direction, the cross head or plate 25 is turned to actuate the rock shaft 26, by virtue of the studs 24 extending into the bearing blocks 23 carried within the guide grooves 21 of the two part nut, and move said parts longitudinally of the shaft. The outer end of the rock shaft 26 has a conventional form of crank or any motion transmitting device so that rocking movement of the shaft 26 may be imparted to steering knuckles or other parts to be actuated by the steering gear.

By reference to Fig. 1, it will be observed that the sleeve 15 abuts the bushing 6 of the steering shaft 5, and the sleeve 9 abuts the sleeve 14, and since the threads between the sleeves 14 and 15 and the two parts of the nut will be subjected to wear, I have employed the adjustable sleeve 9 to take up such wear and eliminate lost motion. It is through the medium of the two-part nut that the sleeve 15 is maintained against the bushing 6 by the adjustable sleeve 9, and it is obvious that such sleeve will maintain a proper mesh between the teeth or threads of the sleeve 14 and the two parts of the nut. Any binding due to imperfection in manufacture, can be relieved by retracting the sleeve 9 until there is free action, and then the sleeve 9 can be forced against the sleeve 14 to cause a smooth and positive action of the mechanism.

It is thought that this novel feature of the invention will be apparent without further description, and we would have it understood that any suitable means may be employed for holding the adjustable sleeve 9 in a locked position relative to the steering shaft 5.

What we claim is:—

1. In a steering gear, the combination of a casing, a steering shaft journaled therein, sleeves on said shaft, a sectional nut in screw-threaded engagement with said sleeves and adapted to have the nut sections move in opposite directions by rotation of said sleeves by said shaft, and means engaging one of said sleeves adapted to compensate for wear between both of said sleeves and said sectional nut.

2. A steering gear as characterized in claim 1, wherein said means includes a sleeve on said shaft against one of the first mentioned sleeves.

3. A steering gear as characterized in claim 1, wherein said means includes a slidable sleeve supporting said shaft and abutting one of said sleeves, a nut on said shaft against said slidable sleeve, and means locking said nut on said shaft.

4. In a steering gear, the combination of a casing, a steering shaft journaled therein, sleeves on said shaft, a sectional nut in screwthreaded engagement with said sleeves and adapted to have the nut sections thereof move in opposite directions by rotation of said sleeves by said shaft, an adjustable sleeve on said steering shaft against one of the first mentioned sleeves and adapted to be adjusted to compensate for wear between the first mentioned sleeves and said nut sections, and means adapted to fix said adjustable sleeve relative to said steering shaft.

5. In a steering gear, a casing, a shaft, spaced nuts in said casing rotated by said shaft and adjustable means on said shaft serving as a bearing for said shaft in a portion of said casing and adapted to take up wear between said shaft and said spaced nuts.

6. In a steering gear having a shaft, sleeves on said shaft, nuts engaging said sleeves and adapted to impart movement to steering mechanism, an end thrust bearing for one of said sleeves, and means engaging the other sleeve adapted through said nuts to shift the first mentioned sleeve to bring pressure to bear on said bearing.

7. A steering gear as characterized in claim 6, and wherein said means includes a slidable bearing sleeve for said shaft.

In testimony whereof we affix our signatures in presence of two witnesses.

DANIEL J. MURNANE.
JOSEPH P. LAVIGNE.

Witnesses:
ANNA M. DORR,
CHAS. W. STAUFFIGER.